E. W. MENGER.
PRESSURE SCREW.
APPLICATION FILED JUNE 24, 1921.
1,387,996.
Patented Aug. 16, 1921.
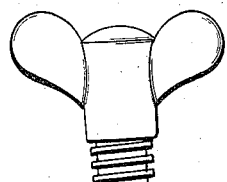
Fig. 1.
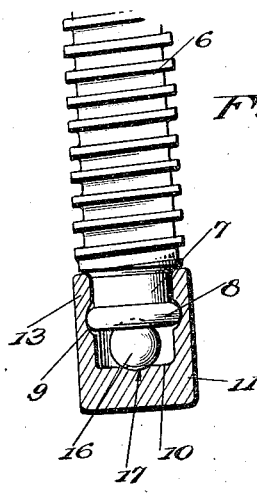
Fig. 2.
Fig. 5.
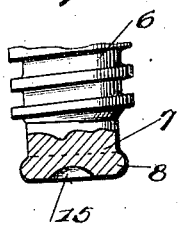
Fig. 3.
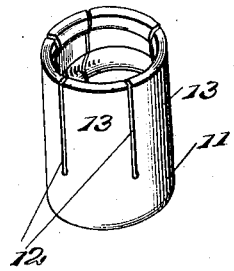
Fig. 4.
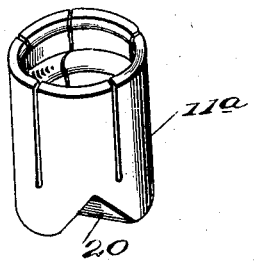
INVENTOR
Edward W. Menger

UNITED STATES PATENT OFFICE.

EDWARD W. MENGER, OF SAN ANTONIO, TEXAS.

PRESSURE-SCREW.

1,387,996.

Specification of Letters Patent. Patented Aug. 16, 1921.

Application filed June 24, 1921. Serial No. 480,174.

*To all whom it may concern:*

Be it known that I, EDWARD W. MENGER, a citizen of the United States, residing at San Antonio, in the county of Bexar and State of Texas, have invented certain new and useful Improvements in Pressure-Screws, of which the following is a specification.

This invention relates to pressure screws employed in C-clamps, screw presses, lathes, lifting jacks and the like.

An important object is to provide a pressure screw having a sphere shaped bearing located between its forward end and the bottom wall of the socket formed in the shoe so that the screw is capable of free rotation with relation to the shoe and so that the shoe may partake of a slight pivotal movement when necessary.

A further object is to provide novel means whereby the aforesaid bearing may be readily renewed and lubricated for the purpose of reducing friction to a minimum.

A further object of the invention is to provide a feed screw which is efficient, durable in use and cheap to manufacture.

Other objects and advantages will be apparent during the course of the following description.

In the accompanying drawing forming a part of this application and in which like numerals are employed to designate like parts throughout the same, Figure 1 is a side elevation of the improved pressure screw used in connection with a clamp.

Fig. 2 is a detail sectional view through the screw.

Fig. 3 is a perspective of a shoe embodied in the invention.

Fig. 4 is a perspective of a modified form of shoe employed under certain conditions.

Fig. 5 is a detail sectional view through the pressure screw.

In the drawing wherein for the purpose of illustration is shown a preferred embodiment of the invention, the numeral 5 designates a clamp in connection with which the pressure screw 6 is used. It is understood, however, that the pressure screw forming the subject matter of this application is not restricted to use in connection with a clamp of the type illustrated but is capable of use in connection with lathe work, screw presses, lifting jacks, etc.

The improved pressure screw is provided with a head 7 having its forward end provided with an annular rounded rib 8 received within an annular groove 9 formed intermediate the ends of a socket 10 formed in a shoe 11. With reference to Fig. 3 in particular, it will be noted that the shoe 11 is formed with a plurality of spaced parallel incisions 12 which define an annular series of spring arms 13 which engage the head 7 rearwardly of the rib 8 and thereby hold the rib 8 in the annular groove 9. In carrying out the invention, the head 7 is formed with a socket 15 which receives a portion of a sphere shaped bearing 16, the said bearing also being partially received in a socket or recess 17 formed in the bottom wall of the socket 10. The location of the sphere shaped anti-friction element 16 permits the pressure screw to be freely rotated with relation to the shoe and also permits the shoe to partake of a limited pivotal movement with relation to the pressure screw when the occasion requires.

As illustrated in Fig. 2, the forward end of the feed or pressure screw is spaced from the bottom wall of the socket 10 thereby forming a space for the reception of oil whereby the bearing 16 and the adjacent faces of the socket 10 and the head 7 may be maintained in a well lubricated condition for the purpose of reducing friction and wear to a minimum.

Should the bearing 16 become broken the same may be removed by slipping the shoe 11 off the forward end of the pressure screw thereby exposing the bearing. As the sides of the bearing 16 are spaced from contact with the sides of the socket 10 the thrust is transmitted directly to the forward end of the shoe.

In the form of the invention illustrated in Fig. 4 the shoe 11ª is formed at its forward end with a V-shaped socket 20 so that the pressure screw may be used in lathe work when turning shafts and the like.

With reference to the foregoing description taken in connection with the accompanying drawing it will be apparent that by reason of the connection between the screw and the shoe, the screw is prevented from crystallizing as the result of continual use. Further, friction is reduced to a minimum so that the screw may be operated with but a small effort on the part of the operator.

I claim:—

1. A pressure screw comprising a body having its forward end provided with a head and an annular rib, a shoe having a socket receiving said head and having yieldable side walls provided with a groove receiving said rib, and a sphere shaped bearing confined between the bottom wall of said socket and the forward end of said head.

2. A pressure screw comprising a body having its forward end provided with a head and an annular rib, a shoe having a socket receiving said head and having a side wall provided with a groove receiving said rib, and a sphere shaped bearing confined between the bottom wall of said socket and the forward end of said head, the bottom wall of said socket and the forward end of said head being provided with recesses receiving the adjacent portions of said bearing.

3. A pressure screw comprising a body having its forward end provided with a head and an annular rib, a shoe having a socket detachably receiving said head and having a side wall provided with a groove receiving said rib, and a sphere shaped bearing confined between the bottom wall of said socket and the forward end of said head, the bottom wall of said socket and the forward end of said head being provided with recesses receiving the adjacent portions of said bearing, the forward end of said head being spaced from the bottom wall of said socket and the sides of said bearing being spaced from the side walls of said socket thereby forming an oil receiving space.

In testimony whereof, I have affixed my signature in the presence of two witnesses.

EDWARD W. MENGER.

Witnesses:
T. J. MENGER,
R. W. MENGER.